L. A. BOURQUENEZ.
TIRE PLUG.
APPLICATION FILED OCT. 2, 1909.
962,615.
Patented June 28, 1910.
Fig. 1
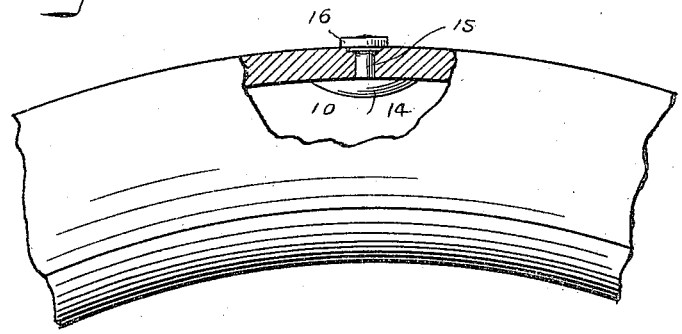
Fig. 2
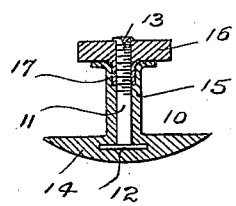
Fig. 3.
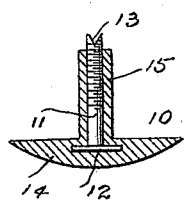
Fig. 4.
WITNESSES:
H. A. Lamb.
S. W. Atherton.
INVENTOR
Leon A. Bourquenez
BY
N. W. Wooster
ATTORNEY

UNITED STATES PATENT OFFICE.

LEON A. BOURQUENEZ, OF BOTSFORD, CONNECTICUT.

TIRE-PLUG.

962,615.  Specification of Letters Patent.  Patented June 28, 1910.

Application filed October 2, 1909.  Serial No. 520,683.

*To all whom it may concern:*

Be it known that I, LEON A. BOURQUENEZ, a citizen of the United States, residing at Botsford, county of Fairfield, State of Connecticut, have invented an Improvement in Tire-Plugs, of which the following is a specification.

This invention has for its object to produce a tire plug which shall combine the advantages of metallic plugs with the advantages of rubber plugs, which shall be simple and inexpensive to produce, easy to apply without the use of other than the simplest tools, which will effectually close a puncture and will remain securely in place under the severest conditions of use.

With these and other objects in view I have devised the novel tire plug which I will now describe, referring to the accompanying drawing forming a part of this specification and using reference characters to indicate the several parts:

Figure 1 is an elevation of a portion of a bicycle tire illustrating the application and use of my novel plug; Fig. 2 a section on an enlarged scale of the plug detached; Fig. 3 an elevation of the plug with the nut removed, and Fig. 4 is a section of the nut detached.

10 denotes the body of my novel plug as a whole. This body comprises a metallic stud 11 which is provided with a head 12, is threaded and is provided with a notch 13 at its outer end. Upon this head and shank I mold or otherwise secure a rubber covering which comprises a pad 14 and a shank 15 surrounding the stud and reaching approximately to the end thereof, the exact length of the rubber shank being unimportant so far as the principle of the invention is concerned. In practice the length of the shank may be varied to adapt it for different thicknesses of tire, it being preferable that the shank be slightly longer than the thickness of the tire. In practice an elliptical pad is found to work admirably, the long diameter of the ellipse being placed longitudinally of the inner wall of the tire or if the puncture is a cross cut it may be placed transversely to the inner wall of the tire.

16 denotes the nut which is threaded to engage the stud and the essential feature of which is a sleeve 17 upon the inner side thereof, the function of which is to pass within the outer end of the rubber shank and expand said shank, forcing it against the wall of the puncture and causing it to effectually close the puncture.

In use the wall of the puncture and the body of the plug are covered with rubber cement to facilitate the insertion of the body and also to assist in effectually sealing the puncture. Special tools may or may not be used in inserting the body. The body may in practice be easily inserted without any tools whatever and held in place with the fingers or by means of a strong thread attached to the shank. Having opened up the puncture in the usual manner and inserted the plug therein, the pad lying against the inner wall of the tire, the nut is applied to the stud and turned tightly down to place, the sleeve 17 of the nut passing within the outer end of rubber shank 15 and expanding said shank against the wall of the puncture and under the nut causing it to effectually close and seal the puncture. The nut may then be locked in place by heading the end of the shank over outward upon the face of the nut. This may be easily done with any simple tool or by means of light blows of a wrench, the notch 13 in the end of the stud enabling this to be done very easily.

Having thus described my invention I claim:

1. A tire plug comprising a headed stud, a pad and shank of rubber inclosing the head and stud and a nut having upon its inner face a sleeve which is adapted to pass within the rubber shank and force it outward against the wall of a puncture.

2. A tire plug comprising a stud which is threaded and is provided with a head and at its outer end with a notch, for the purpose set forth, a pad and shank of rubber inclosing the head and stud and a nut having upon its inner face a sleeve which is adapted to pass within the shank.

In testimony whereof I affix my signature in presence of two witnesses.

LEON A. BOURQUENEZ.

Witnesses:
 PAUL MORROW,
 JOHN OSBORE.